United States Patent [19]

Genise

[11] Patent Number: 5,033,596
[45] Date of Patent: * Jul. 23, 1991

[54] RESILIENT FRICTION MATERIAL

[76] Inventor: Thomas A. Genise, 449 Lafayette, Dearborn, Mich. 48128

[*] Notice: The portion of the term of this patent subsequent to Jul. 4, 2006 has been disclaimed.

[21] Appl. No.: 431,008

[22] Filed: Nov. 2, 1989

Related U.S. Application Data

[63] Continuation of Ser. No. 174,475, Mar. 28, 1988, abandoned.

[51] Int. Cl.$^5$ .................. F16D 13/64; F16D 69/02
[52] U.S. Cl. ........................ 192/53 F; 192/107 M; 192/107 R
[58] Field of Search .......... 192/107 R, 107 M, 107 C, 192/53 R, 53 F, 66; 74/339

[56] References Cited

U.S. PATENT DOCUMENTS

| | | | |
|---|---|---|---|
| 2,059,935 | 11/1936 | Eason | 192/66 |
| 2,144,674 | 1/1939 | Campbell | 192/66 |
| 2,150,498 | 3/1939 | Thomson | 192/53 R |
| 2,319,740 | 5/1943 | Lapsley et al. | 192/536 |
| 2,518,734 | 8/1950 | Wemp | 192/53 E |
| 3,498,417 | 3/1970 | Schmid | 192/70.15 |
| 3,983,979 | 10/1976 | Richards | 192/53 F |
| 4,141,440 | 2/1979 | Richards | 192/53 F |
| 4,176,736 | 12/1979 | Richards et al. | 192/53 F |
| 4,291,794 | 9/1981 | Bauer | 192/107 M |
| 4,700,823 | 10/1987 | Winckler | 192/107 M |
| 4,703,667 | 11/1987 | Richards | 74/339 |

FOREIGN PATENT DOCUMENTS

| | | | |
|---|---|---|---|
| 63375 | 7/1892 | Fed. Rep. of Germany | 192/66 |
| 567487 | 4/1946 | United Kingdom | 192/53 R |

Primary Examiner—Rodney H. Bonck
Assistant Examiner—Andrea Pitts

[57] ABSTRACT

A blocker-clutch assembly (10) includes an openly porous, pyrolytic carbon composite friction material (74) configured for optimum performance and, therefore, prevention or substantial prevention of nonsynchronous engagement of positive clutch members (12,14) due to premature unblocking of blocker tooth ramps (48–54). The composite friction material is formed to be resilient in direction normal to its friction surface (76b), is cut into segments (76), is bonded to a frustoconical surface (62) in a manner preseving the resiliency and with the segments circumferentially spaced apart, and is configured to control engagement force thereon in a range of 150–300 pounds per square inch (10–20 Kg/cm$^2$).

10 Claims, 5 Drawing Sheets

RESILIENT FRICTION MATERIAL

This is a continuation of copending application(s) Ser. No. 07/174,475 filed on Mar. 28, 1988 now abandoned.

CROSS-REFERENCE TO RELATED APPLICATION

This application is related to U.S. applications Ser. No. 150,355, filed Jan. 29, 1988 and Ser. No. 174,277, filed Mar. 28, 1988 and now U.S. Pat. No. 4,844,218. Both of these applications are assigned to the assignee of this application.

1. Field of the Invention

This invention relates to liquid cooled, frictionally engaged, energy absorbing devices such as clutches and brakes. More specifically, the invention relates to an openly porous, resilient friction material and to a method of affixing the material to a support member.

b 2. Background of the Invention

Openly porous carbon/carbon composite, friction material formed of carbon fiberous substrate coated with pyrolytic carbon by chemical vapor deposition (CVD) is known in the prior art as may be seen by reference to U.S. Pat. Nos. 4,291,794 and 4,700,823. The disclosures of these documents are incorporated herein by reference.

Blocked, change gear transmissions of the single and compound type are also known in the prior art as may be seen in U.S. Pat. Nos. 3,983,979; 4,141,440; 4,176,736; and 4,703,667. The disclosures of these documents are also incorporated herein by reference.

Blocker-clutch assemblies used in these change gear transmissions include first and second positive or jaw clutches which are axially moved between engaged and disengaged positions to effect gear changes. Each assembly includes a frictionally engagable blocker ring which prevents asynchronous engagement of the jaw clutches in response to initial engaging movement thereof. The blocker ring is supported by the first jaw clutch for limited rotation relative thereto and includes a friction surface which engages a second friction surface, secured for rotation with the second jaw clutch, in response to the initial engaging movement of the jaw clutches. If the jaw clutches are rotating at different speeds during the initial engaging movement thereof, the frictional engagement effects limited rotation of the blocker ring to a position blocking engagement of the jaw clutches until substantial synchronization of the jaw clutches is achieved.

The above described blocker-clutch assemblies have greatly reduced the complexity and effort required to effect gear changes. However, for various surmised reasons the blocker rings have been known to prematurely move to the unblocking position before the jaw clutches reach synchronism or substantially synchronous speeds, thereby allowing asynchronous engagement of the jaw clutch teeth with resultant excessive wear thereto and in some cases failure of the jaw clutches.

SUMMARY OF THE INVENTION

An object of the invention is to provide an openly porous, resilient friction material for a friction energy absorbing device.

Another object of the invention is to provide such a friction material for friction means in synchronizer or blocker assemblies used in step ratio transmissions.

According to a feature of the invention, an energy absorbing device, as disclosed in U.S. Pat. Nos. 4,291,794 and 4,700,823, includes at least two relatively rotatable members with confronting function surfaces engagable to retard the relative rotation; an openly porous carbon/carbon composite material affixed to at least one of the members for defining at least one of the friction surfaces, the material including a substrate defined by a carbon fiberous material woven into a single layer substrate or fabric and coated with carbon deposited thereon by chemical vapor deposition process to a density of 0.3 to 1.3 g/cc; a liquid coolant in communication with the surfaces; and an actuator means for effecting frictional engagement of the surfaces. The invention is characterized by the fiberous material and weave being formed to provide the substrate with resiliency in a direction normal to the plane of the weave before and after the chemical vapor deposition process; and the composite being affixed to the one member in a manner substantially preserving the resiliency.

BRIEF DESCRIPTION OF THE DRAWINGS

A preferred embodiment of the invention is shown in the accompanying drawings in which.

DETAILED DESCRIPTION OF THE DRAWINGS

Prior to proceeding with the detailed description, definitions of a few technical terms are provided to facilitate a clearer understanding of the invention.

1. Pyrolytic carbon composite material—a carbon fiberous substrate coated or densified with pyrolytic carbon by a chemical vapor deposition (CVD) process.

2. Substrate—an assemblage of carbon fibers or filaments.

3. Filament—a fiber whose aspect ratio (length to effective diameter) is for all practical purposes infinity, i.e., a continuous fiber.

4. Fiber—relatively short lengths of very small cross-sections which may be chopped filaments (ref., Engineers' Guide to Composite Materials, American Society of Metals, Metals Park, Ohio 44073, Copyright 1987).

5. Strand—a bundle of continuous filaments combined in a single compact unit without twist (ref., Engineers' Guide to Composite Materials, American Society of Metals, Metals Park, Ohio 44073, Copyright 1987).

6. Yarn—an assemblage of twisted fibers or strands to form a continuous yarn or spun yarn suitable for use in weaving (ref., Engineers' Guide to Composite Materials, American Society of Metals, Metals Park, Ohio 44073, Copyright 1987).

7. Bonding material—elements or substances capable of holding two materials together primarily by surface attachment, e.g., adhesives or brazings.

8. Adhesion—the state in which two surfaces are held together at an interface by forces or interlocking action or both.

9. Mechanical Adhesion—adhesion between surfaces in which the adhesive holds the parts together by interlocking action.

10. Carbon—herein the term carbon includes graphite unless the term graphite is explicitly used.

11. Total Porosity—includes open and closed pores or voids in the composite material. Open pores are open to the surface of the composite and may extend completely through the composite.

12. Synchronizer—a device having blocker means for preventing asynchronous engagement of jaw or spline teeth of positive clutch members, and friction means operative to effect engagement of the blocker means and to generate sufficient torque during most operating conditions to drive the positive clutch members toward synchronism.

13. Blocker—a device similar to a synchronizer but not operative during most operating conditions to generate sufficient torque to effectively drive the positive clutch members toward synchronism. Blockers of the general type disclosed herein are known in the art as may be seen in reference to previously mentioned U.S. Pat. Nos. 3,983,979; 4,141,440; 4,176,736; and 4,703,667.

Figure 1:
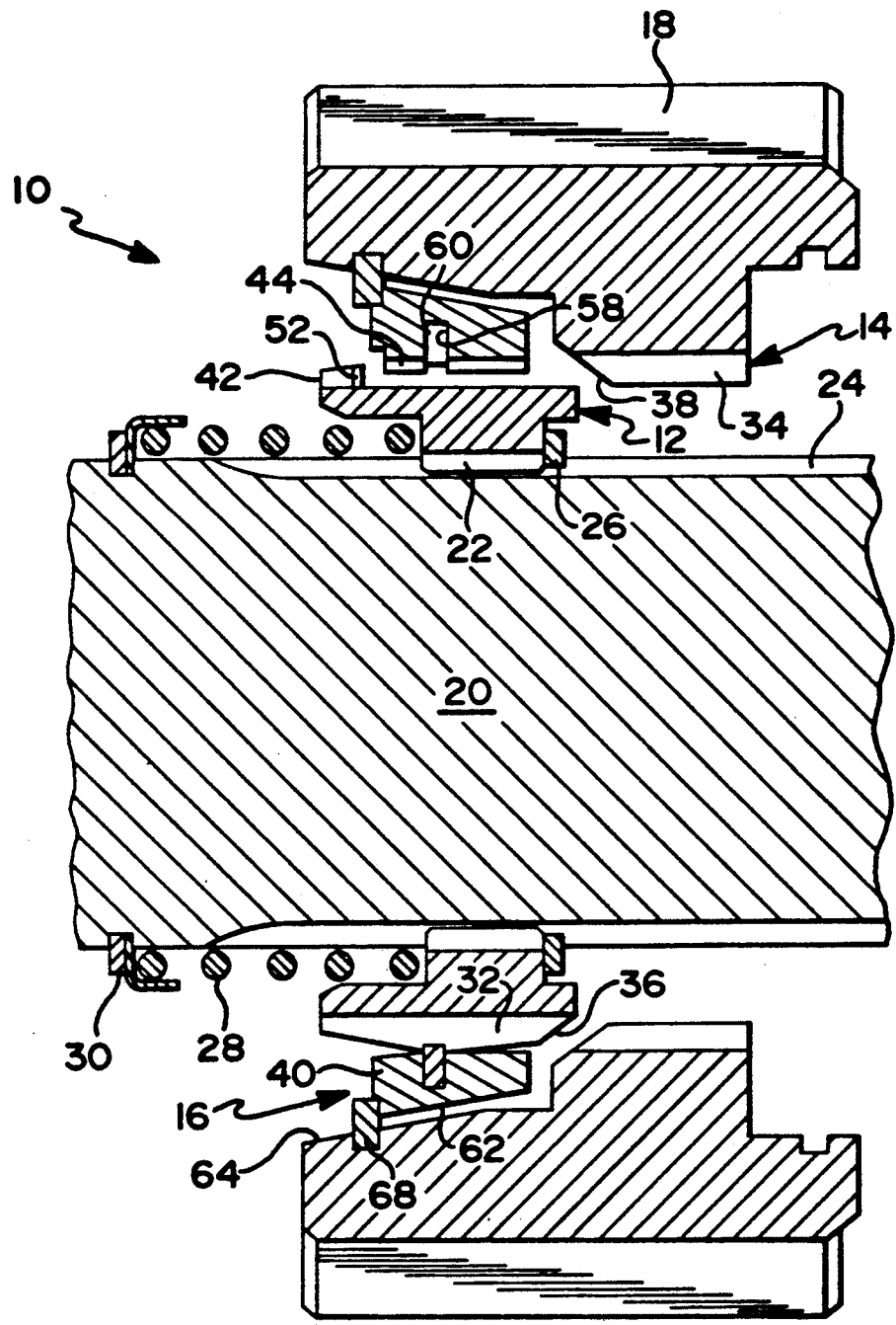
FIG. 1 is a sectional view of a blocker-clutch assembly comprising an environment for use of the invention.
Figure 2:
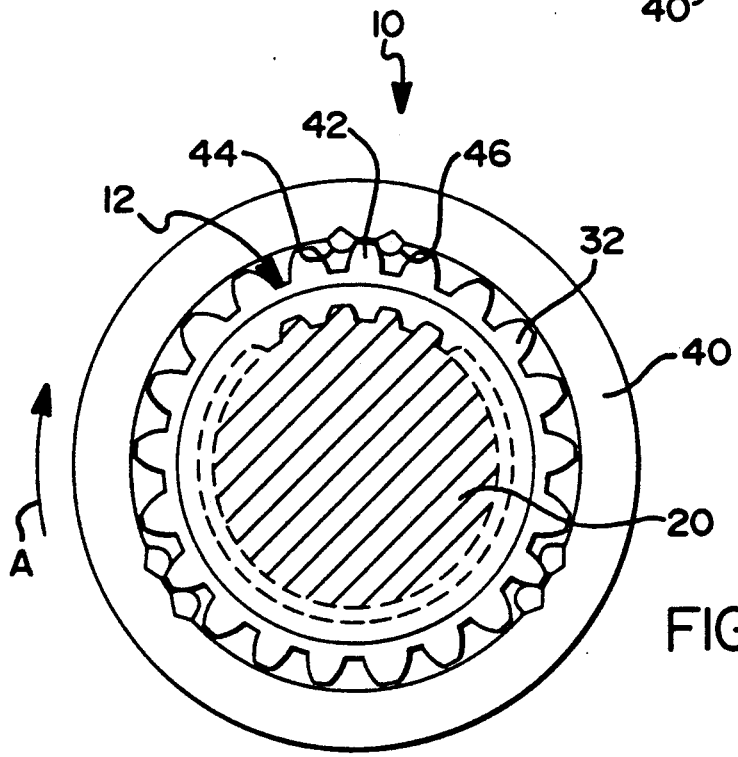

Referring now to FIGS. 1, 2, therein is illustrated a blocker-clutch assembly 10 having first and second positive clutch members 12,14 and a blocker mechanism 16 for preventing asynchronous engagement of the clutch members which are respectively connected to a shaft 20 and a gear 18. Gear 18 and shaft 20 may form part of a 4×3 compound transmission such as the twelve forward speed, semi-blocked splitter type compound transmission disclosed in U.S. Pat. No. 4,703,667. Therein shaft 20 would be a transmission main shaft disposed at an extension of its left end into a main transmission section having four change speed ratios. Gear 18 would be a constant mesh splitter gear disposed in an auxiliary transmission section.

Clutch member 12 is provided with internal splines 22 which are disposed with corresponding external splines 24 provided on shaft 20 for interconnecting clutch member 12 to the shaft for rotation therewith. The cooperating splines permit clutch member to freely slide axially relative to shaft 20. A stop ring 26 is seated within a suitable groove formed in the external periphery of the shaft and disposed for contacting clutch member 12 and limiting rightward axial movement thereof. Clutch member 12 is resiliently urged rightward by a spring 28 which reacts at its left end against a spring seat 30 secured to shaft 20 in a manner similar to stop ring 26.

Clutch member 12 is provided with external spline teeth 32 thereon which are adapted to meshingly engage internal spline teeth 34 of clutch member 14 provided on gear 18. Teeth 32 of clutch member 12 are tapered, as at 36, in a manner similar to the leading edge 38 of teeth 34 on gear 18. The tapered conical surface defined by the tapered leading edges extends at an angle of between 30° and 40° relative to the longitudinal axis of the shaft. The exact degree of taper and the advantages thereof are explained in detail in U.S. Pat. No. 3,265,173.

A selected number, herein three, of external spline teeth 32 are partially removed for permitting the presence of a blocker ring 40 of the blocker mechanism which is further described hereinafter. Such partial removal leaves three axially shortened blocker tooth portions 42 for cooperating with blocker ring 40. Preferably, the tooth portions are disposed in a common plane and circumferentially spaced equal distances apart; however, an asymmetrical arrangement such as disclosed in U.S. Pat. No. 4,703,667 may be used in some applications. The blocker ring comprises a nondeformable ring encircling clutch member 12. The ring, as may be seen by also referring to FIGS. 3-5, includes an appropriate number, herein three pairs, of radially inwardly extending projections 44,46 which, when properly positioned, mate with external spline teeth 32. Each pair of projections 44,46 have a total circumferential dimension less than the corresponding circumferential spaces defined by partially removing the tooth portions, thereby allowing limited clockwise and counterclockwise rotation of the blocker ring relative to clutch member 12 from a position seen in FIG. 3 wherein the spaces between tooth projections 44,46 align with tooth portions 42. Contact of the sides or flanks of either tooth projection 44,46 with the sides or flanks of spline teeth 32 on either side of the space provided by the partial tooth removal will limit such relative rotation and cause blocker ring 40 to rotate with clutch member 12. The space between each inwardly projecting tooth pair 44,46 has a clearance distance wider than the corresponding circumferential dimension of tooth portions 42 so that when properly aligned at synchronism (or more accurately when the relative speeds of blocker ring 40 and clutch member 12 cross synchronism) the tooth projections 44,46 will straddle tooth portions 42 and clutch member 12 can move axially through but not past blocker ring to effect engagement with spline teeth 34 of gear 18.

Figure 3:
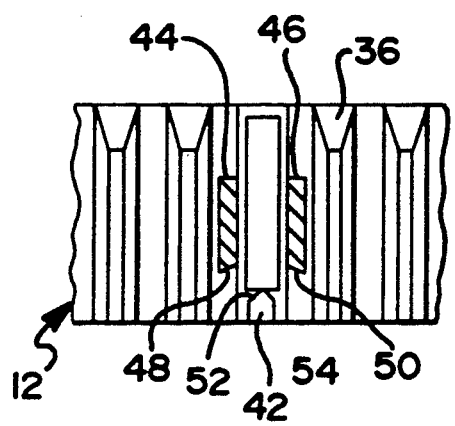
FIGS. 2-5 illustrate features of the assembly in FIG. 1.
Figure 4:
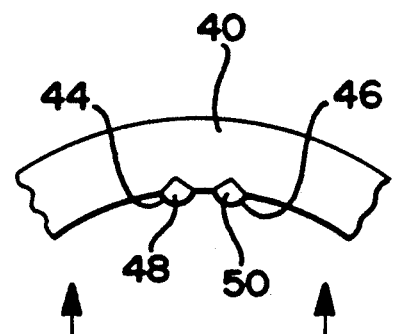
Figure 5:
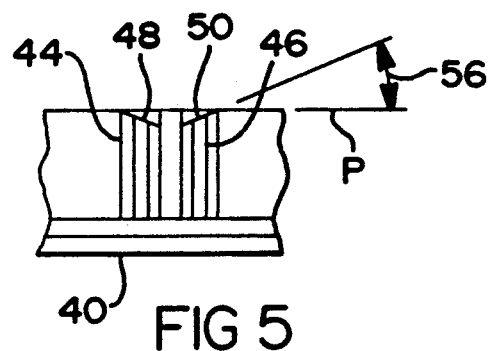

As may be seen in FIGS. 3-5, the end faces of tooth projections 44,46, which function as blocker teeth, are tapered or ramped as at 48,50. The end face of each tooth portion 42 is also preferably provided with tapers or ramps 52,54 corresponding with tapers or ramps 48,50. The angles 56 of the ramps 48–54 are selected such that blocking teeth 44,46 and tooth portions 42 remain in proper blocked position when unshown but previously mentioned main transmission section at the left end of shaft 20 is not in neutral, but will tend under a contacting force, such as the force provided by spring 28, to cause the blocker and clutch member to assume a nonblocking position when the main transmission is in neutral and the gear 18 has been selected for engagement. Such ramps are known in the art as sensor unblocking ramps. Ramp angles 56 of about 15°–25°, preferably 20°, relative to a plane P normal to the axis of rotation of shaft 20 have proven highly satisfactory for most known semi-blocked transmissions.

As described in greater detail by reference to U.S. Pat. Nos. 3,921,469 and 3,924,484, the radially inner side of blocker ring 40 may be provided with a groove 58 which receives a split, annular, resilient ring 60. Ring 60 is normally of slightly less internal diameter than the external diameter of clutch member teeth 34 so that when the parts are in the assembled condition, ring 60 is distorted slightly outwardly to thereby exert a light but definite resilient clamping pressure against the external surfaces of teeth 34. Inasmuch as ring 60 fits loosely within the walls of groove 58, the resilient clamping pressure effects a significant resistance to axial movement between the blocker ring and clutch member but only an insignificant resistance to relative rotative movement therebetween.

Blocker ring 40 includes a generally outward facing frustum of a cone shape or frustoconical surface 62 positioned to frictionally engage a generally inwardly facing frustum of a cone or frustoconical surface 64 on a radially inner wall of gear 18 in response to initial axial engaging movement of gear 18 leftward by a shift fork 66 schematically illustrated in FIGS. 6. The axial drag provided by resilient ring 60 resists axial movement of blocker ring 40 relative to clutch member 12 which is biased rightward by spring 28. Accordingly, ring 60 functions as a pre-energizer ring whose axial drag effects initial engagement of the surfaces 62,64 prior to axial movement of the blocker ring 40. A stop ring 68 limits movement of blocker ring 40 away from frustoconical surface 64 when gear 18 is moved rightward to effect disengagement of positive clutch members 12,14.

With respect to FIGS. 2-5 and assuming shaft 20, clutch member 12, and gear 18 are normally driven in a clockwise direction (arrow A in FIG. 2), it is apparent that a nonsynchronous condition comprising gear 18 rotating faster than shaft 20 and clutch member 12 will cause blocking ring 40 to rotate clockwise a limited amount relative to clutch member 12 as soon as frustoconical surfaces 62,64 engage. Initial engagement of surfaces 62,64 is, of course, in response to initial engaging movement of gear 18 by shift fork 66 and the axial drag provided by per-energizer ring 60. Shift fork 66 is connected to a piston 70 in an actuator 72 which receives pressurized air for moving the piston to and fro in known manner. The torque applied to blocker ring 40 by the initial frictional engagement due to the drag of pre-energized ring, through relatively, small is sufficient to axially align ramps 48 of the blocker tooth projections 44 with ramps 52 of tooth portions 42 prior to axial engagement of the ramps. Once the ramps engage, the force of spring 28 is transmitted through the interface of the ramps to increase the engaging force of the friction surfaces and thereby proportionally increase the blocking torque which is counter to the unblocking torque provided by ramps 48,52. In theory, this increased blocking torque is sufficient to maintain blocking engagement of the ramps until clutch members 12,14 cross synchronism.

Figure 6C:
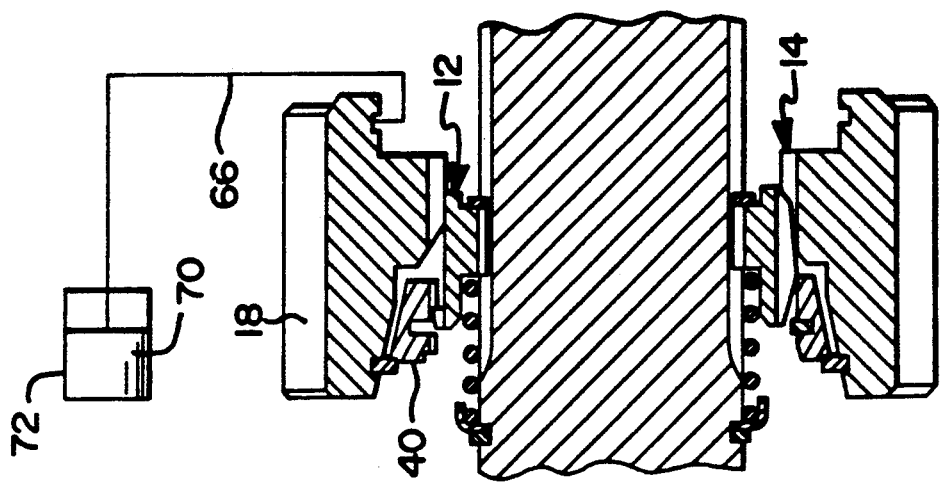
FIGS. 6A-6C respectively illustrate the blocker-clutch assembly in a neutral or nonselected position, in a preselected position, and in an engaged position.
Figure 6B:
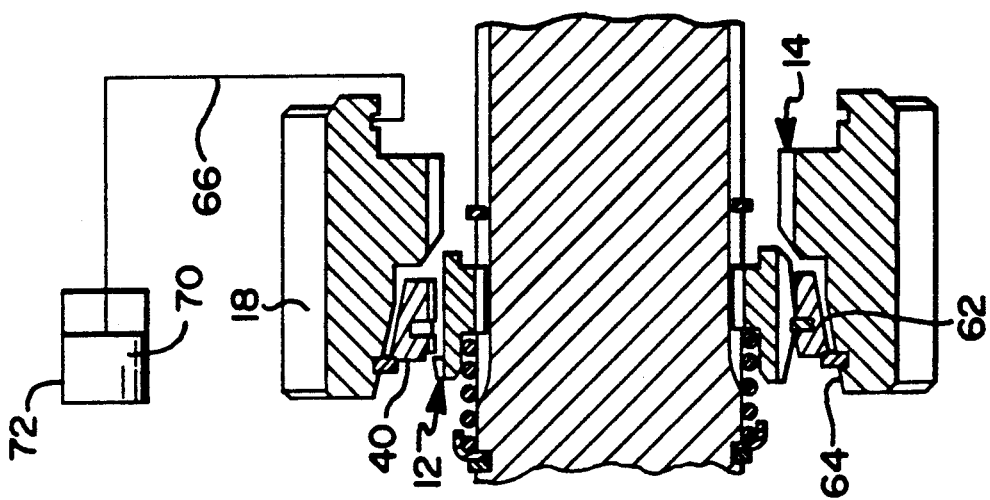
Figure 6A:
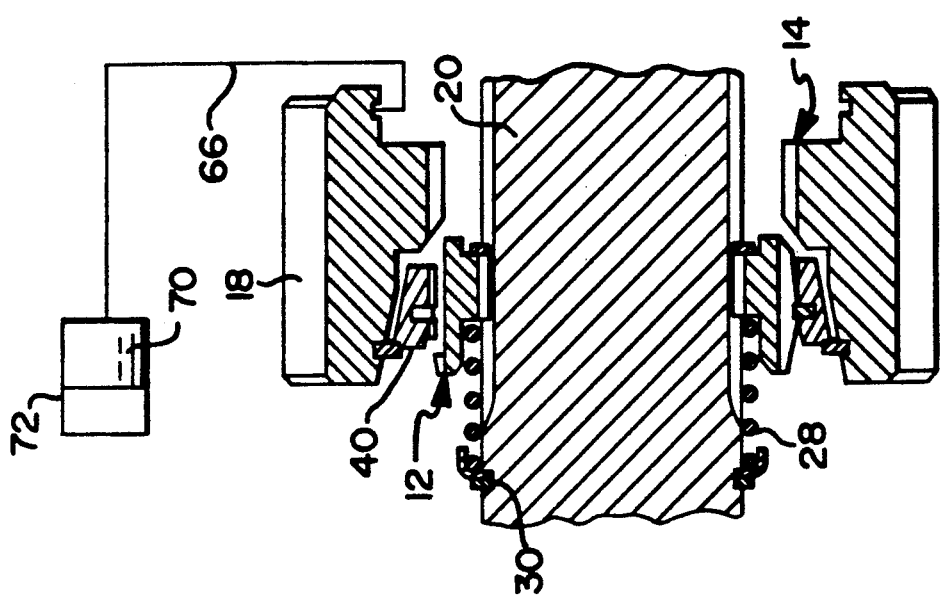

Blocker-clutch assembly 10, as thus far described, is generally known in the prior as may be seen by reference to previously mentioned U.S. Pat. No. 4,703,667. Such assemblies provide for preselection of the ratio gears they are associated with, e.g., the actuating means (shift fork 66 and piston 72) for engaging the positive clutch members 12,14 may be fully displaced prior to synchronism therebetween. Actual engagement of the positive clutch members occurs at a later time, as may be seen by reference to FIGS. 6A-6C. Briefly, FIG. 6A illustrates a neutral or nonselected position of blocker-clutch assembly 10. FIG. 6B illustrates a preselected position wherein gear 18, clutch member 14, shift fork 60, and piston 72 are fully displaced with clutch member 12 moved leftward against the bias force of spring 28 and with frustoconical surfaces 62,64 frictionally engaged to maintain a blocking position until synchronism is crossed do to manual or automatic means changing the speed of shaft 20 and/or gear 18. Such means are known and are typically provided by changes in the speed of a prime mover connected to shaft 20 and/or by use of a brake connected to the shaft or gear. When an unblocking condition occurs, as the clutch members cross synchronism, the biasing force of spring 28 moves or fires clutch member 12 into engagement with clutch member 14. Since relatively high synchronism crossing rates often occur, spring 28 must provide sufficient force to quickly move clutch member 12 into engagement. FIG. 6C illustrates the engaged position of the positive clutch members.

Now with respect to the present invention, it is known, as disclosed in U.S. Pat. No. 4,703,667, that blocker-clutch assemblies having unblocking ramps, such as ramps 48-54, have a tendency under certain dynamic operating conditions to prematurely unblock or crash and allow nonsynchronous engagement of clutch members 12,14. Hereinafter is disclosed an improved friction material configuration at the interface of the frustoconical surfaces which has, to date, completely solved the premature unblocking or crash problem while at the same time substantially reducing manufacturing cost of the blocker-clutch assemblies.

Figure 7:
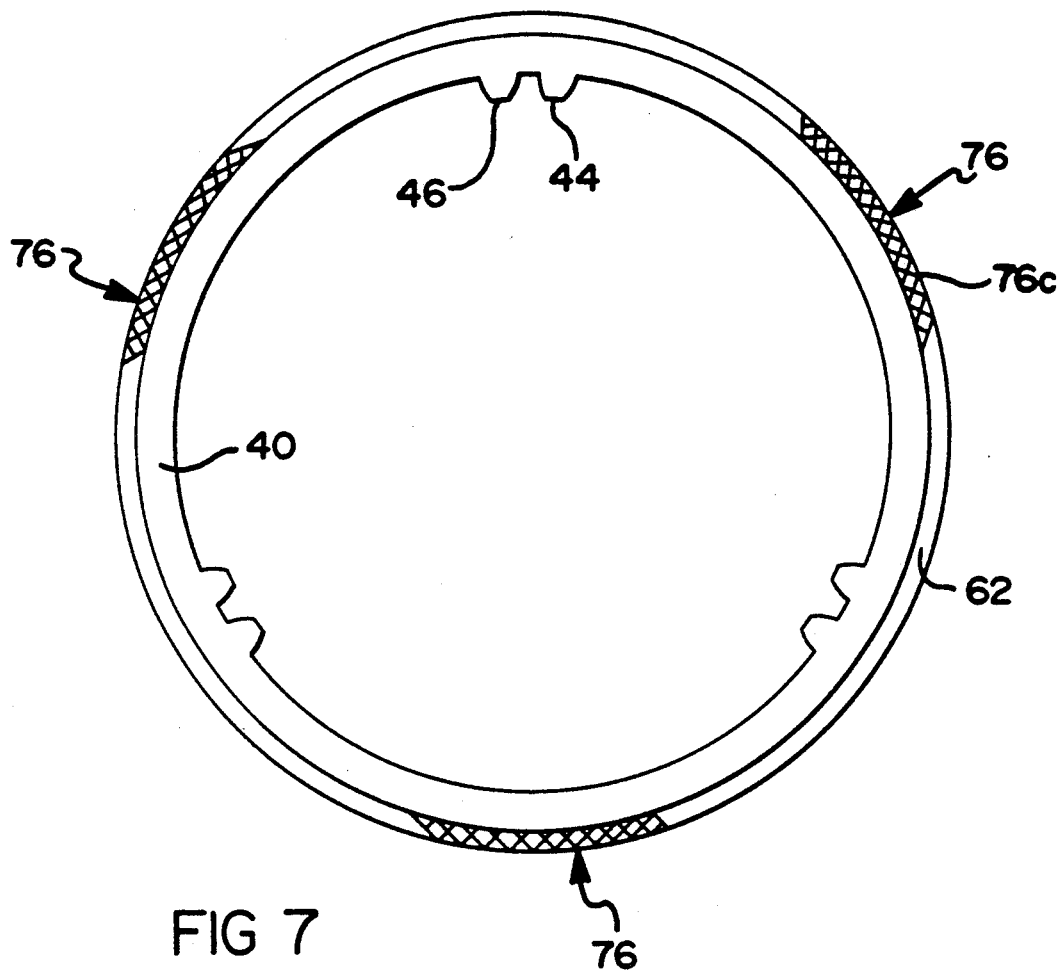
FIGS. 7-8 illustrate the configuration and position a carbon/carbon composite friction material according to the invention.
Figure 8:
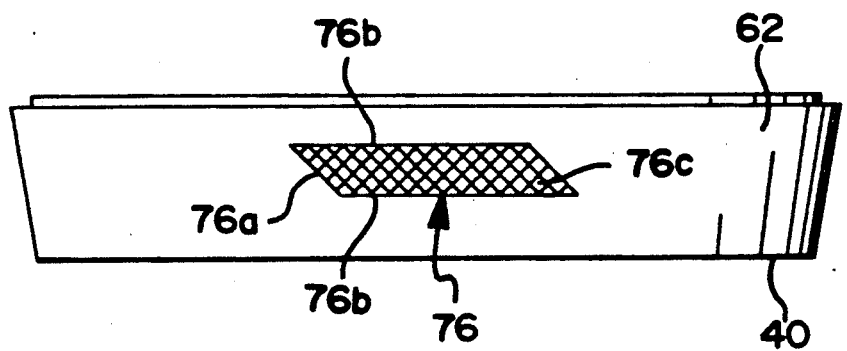
Figure 9:
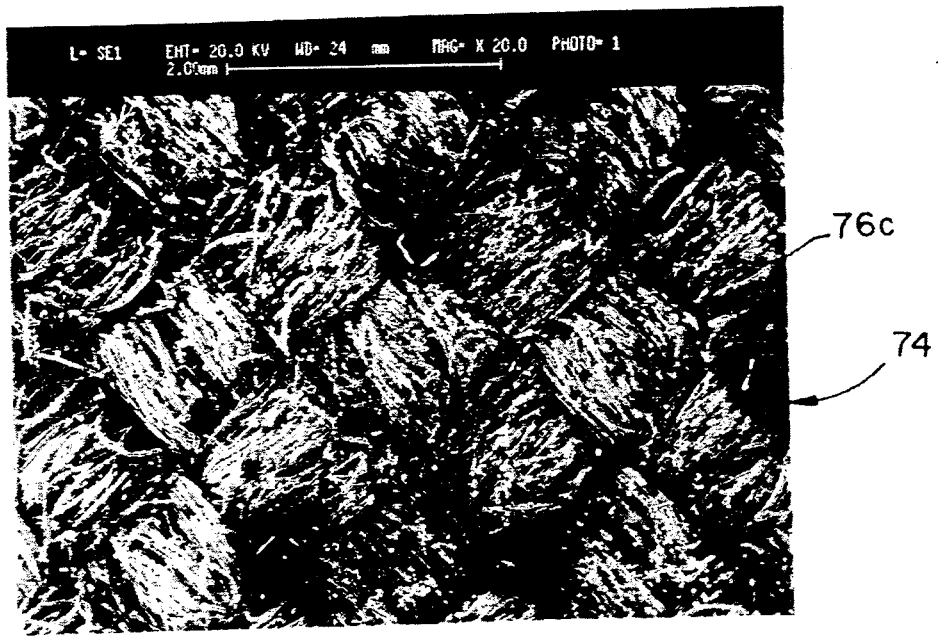
FIGS. 9-10 are enlarged photographic plan views of the friction surface of the material.
Figure 10:
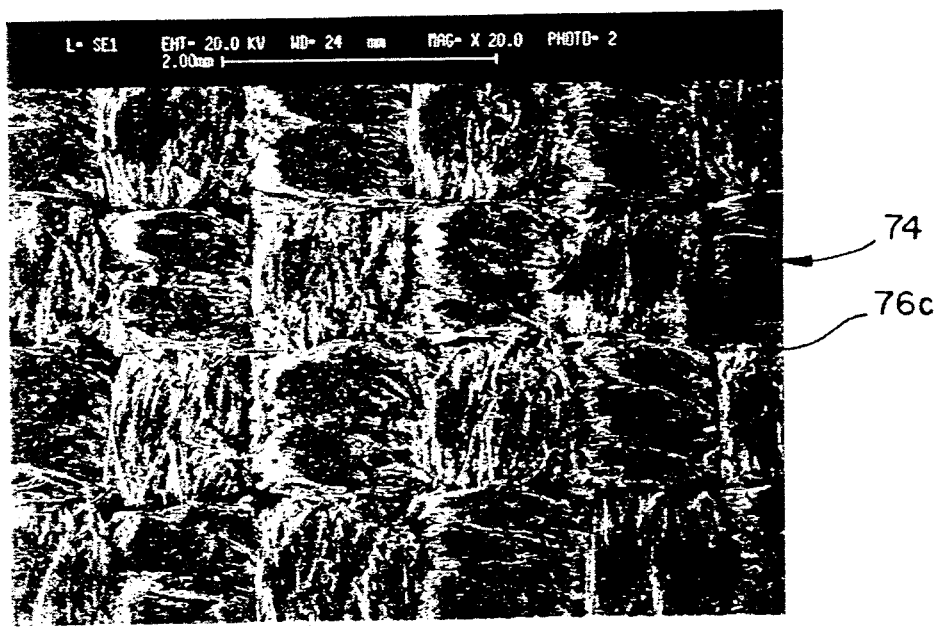

By reference now to FIGS. 7-10, therein is disclosed a carbon/carbon composite friction material 74. FIGS. 9, 10 are enlarged photographic plan views of material 74. FIG. 9 shows the texture and porosity of the friction surface of the material prior to testing and FIG. 10 shows the friction surface after crash free testing equal to over three life cycles of blocker-clutch assembly 10. FIGS. 7, 8 illustrate the configuration and position of the material on blocker ring surface 62.

The material 74 is preferably formed of a single woven layer substrate of carbon fibers coated or infiltrated by chemical vapor deposition (CVD) process with pyrolytic carbon. The fibers may be formed of many known materials, but are preferably formed of carbonized rayon or polyacrylinitrite (PAN). Carbon filaments may be used in lieu of fibers provided the weave of the fabric is sufficiently resilient in directions normal to the plane of the fabric, i.e., direction normal to the friction plane of the material when it is in use. Acceptable CVD processes are taught in U.S. Pat. Nos. 4,291,794 and 3,944,686; the first patent teaches a batch process and the second a continuous process. The composite may have a density range of 0.3 to 1.3 gm/cc after the CVD process and prior to bonding to surface 62. However, material on the low end of this range may have a higher wear rate. Material on the high end of the range is currently more expensive and may tend to be too rigid for optimism performance. Accordingly, a range of 0.7 to 1.1 gm/cc is considered to be some what more optimum.

Excellent performance has been obtained with materials spec'd to have a density of 0.8 to 1.0 gm/cc and, as tested, measured to have a density of about 0.84 gm/cc.

Manufacturing specifications for this material require the fibers to be based on PAN filaments chopped and spun into yarn; the yarn weight to be 2/10 worsted count; the fabric weave to be 2×2 equally tensioned basket square weave at 18 to 22 pairs per inch (2.54 cm); the density to be 0.8 to 1.1 gm/cc by CVD densification at temperatures not to exceed 1,200° C.; and the thickness to be 0.045 inches (0.11 cm). The texture of the densified or finished material is substantially the same to the naked eye as the woven fabric substrate. The finished material is relatively flexible; is relatively resilient in the previously mentioned direction normal to the plane of the fabric with such resiliently being attributed to the use of spun yarns, weave, and density; and is openly porous with many to the pores being through pores. Carbon/carbon composite materials comprised of substrates formed of woven carbon fibrous yarns (particularly, yarns of twisted carbon fibers) coated or densified with pyrolytic carbon by CVD process to densities less than 1.3 gm/cc have exhibited greater resiliency in all directions than do composite materials comprised of substrates for of comparable amounts of woven carbon fibrous strands coated or densified with carbon by CVD process to comparable densities.

Minimum waste of material 74 is achieved by cutting the material into polygonal segments 76 which may be circumferentially spaced apart when affixed or bonded to a support member such as surface 62 of blocker ring 40. Alternatively, the segments may abut each other to define a continuous friction ring surface. When the segments are circumferentially spaced apart, as illustrated in FIG. 7, the leading edges 76a of the segments may be disposed oblique to the direction of rotation of friction surface 76c defined by segments 76 to facilitate rapid wiping of excess oil (cooling fluid) off mating surfaces 64, thereby quickly achieving maximum or design coefficient of friction at the interface of friction material surface 76c and surface 64 in response to initial engagement due to the force transmitted by pre-energizer ring 60. The segments are preferably cut into parallelograms and bonded to blocker ring surface 62 with sides 76b of the material generally oriented parallel to planes extending normal to the axis of rotation; however, such orientation is not believed to be critical. Further, three substantially equally spaced segments are preferred.

Excellent bonds of the material to surface 62 have been achieved using nitrile-phenolic adhesives which are well known in the art. Such adhesives readily withstand operating temperature peaks in the range of 400° F. (200° C.) for short periods of time. For applications producing higher temperatures, other bonding materials are suggested, such as disclosed in U.S. patent application Ser. No. 150,355, filed Jan. 29, 1988.

Resiliency preserving bonding of the composite material to blocker ring 40 with nitrile phenolic has been obtained by the following method:

1. cutting the material into conveniently handled sizes,
2. heating the material to about 150°–180° F. (65° to 85° C.),
3. rolling the adhesive in sheet form on the material,
4. shearing or cutting the material with adhesive into segments of desired shape and size,
5. placing the blocker ring in a fixture, positioning the adhesive side of the segments on support surface 62, and applying a relatively evenly distributed pressure of about 200 pounds per square inch (45 Kg/cm$^2$) to the friction side of the material,
6. heating the fixture and material therein in a convection oven for about 40 minutes while maintaining the force substantially unchanged.

The adhesive used in the above example was B. F. Goodrich Plastilock 601 having an 8 mil. (0.2 mm) thickness.

To prevent loss of the material's resiliency it is important curing the bonding process to limit penetration of the adhesive into the open porosity of the material and to limit the pressure applied to the material while heat curing the adhesive. As may be deduced, adhesive penetration is readily controlled by stringent control of the amount of adhesive and/or stringent control of the pressure applied to the material. Excessive bonding pressure tends to extrude even correctly applied amounts of the adhesive deeply into the pores of the material. Further, excessive bonding pressures tend to crush or compact the material with resultant loss of resiliency and porosity. Accordingly, proper bonding pressures are readily determined by bearing in mind that the pressure should be sufficient to firmly hold the material during the bonding process without overly compacting or crushing the material.

Further with respect to porosity and resiliency, the spun yarns and weave of the yarns provide an openly porous substrate or fabric which is relatively resilient in the direction normal to the weave of the fabric. A substantial portion of the substrate open porosity and resiliency is retained by the composite material by limiting CVD coating or densification of the substrate to the range of 0.3 to 1.3 gm/cc (preferably 0.8 to 1.1) gm/cc. Further, the open porosity and resiliency of the composite material in the area of its friction surface is maintained during the bonding process by using volumes of adhesive that are less than the open porosity volume of the composite, and by limiting the magnitude of the bonding process pressure for minimizing crushing the composite material and for maintaining the open porosity volume of the composite material greater than the volume of the adhesive, whereby the volume of the open pores adjacent to the bond side of the composite material consumes the adhesive while the pores adjacent to the friction side remains free of the adhesive. Bonding pressures less than 250 pounds per square inch (17.6 Kg/cm$^2$) are considered adequate for most carbon/carbon composite materials acceptable for use with blocker-clutch assembly 10.

It has been discovered that premature unblocking can be effectively eliminated by controlling unit loading on the friction surface 76c of material 74 within a range of 150–300 pounds per square inch (10–20 Kg/cm$^2$). Since such unit loading in an assembly such as blocker-clutch assembly 10 is primarily a function of the biasing force of spring 28 and since the force of spring 28 must be within a rather narrow range, unit loading has been controlled by tailoring or configuring the surface area 76c of material 74. By way of example, crash free operation has been obtained in tests of blocker-clutch assembly 10 using three parallelogram shaped segments 76 having a combined friction surface area of 1.17 square inches (7.55 cm$^2$). In this example, cone surfaces 62,64 have an angle of about 10° and a mean diameter of about 4.35 inches (11 cm), ramps 48–54 have an angle of about 20°, and spring 28 provides a biasing force of about 50 pounds (27 Kg) when compressed in FIG. 62.

In the blocker-clutch assembly of this example, the combined friction surface areas 76c constitute a 83% reduction in total friction material surface area relative to the blocker-clutch assembly disclosed in U.S. Pat. No. 4,703,667 and the pressure at the interface of the combined surface areas 76c is 210 pounds per square inch (14.8 Kg/cm$^2$).

A preferred embodiment of the invention has been disclosed for illustrative purposes. Many variations and modifications of the preferred embodiment are believed to be within the spirit of the invention. The following claims are intended to cover the inventive portions of the preferred embodiment and modifications believed to be within the spirit of the invention.

What is claimed is:

1. A method of providing a rigid member with a resilient friction surface defined by a carbon/carbon composite material comprising a substrate defined by a carbon fibrous material woven into a single layer of fabric coated with carbon deposited on the fibrous material by chemical vapor deposition process; the method characterized by the steps of:

forming the fibrous material of yarns defined by carbon fibers;

weaving the yarns into an openly porous fabric having resiliency in a direction normal to the plane of the fabric, said resiliency being greater than the resiliency of a comparable weave formed of carbon fibrous strands;

limiting the carbon coating of the fibers for retaining a given amount of the open porosity and resiliency of the fabric;

cutting the composite material into segments;

affixing the composite material to the member in a manner preserving the composite materials open porosity and resiliency at least at the surface of the composite material by the steps of:

sandwiching an adhesive between the member and at least three circumferentially spaced apart segments of the material, the volume of the adhesive being less than the open porosity volume of each associated segment;

applying a substantially evenly distributed pressure to the friction surfaces of the segments for effecting extrusion of the associated adhesive into the open pores of the segments;

limiting the magnitude of the pressure for minimizing crushing of the composite material and for maintaining the open porosity volume of each segment greater than the volume of the associated adhesive;

applying heat to the segments, the adhesive, and the member for effecting extrusion of the adhesive into the open pores adjacent thereto and for curing of the adhesive; and maintaining the limited pressure while applying the heat.

2. The method of claim 1, comprising the steps of:

coating the composite material to a level providing a composite density of 0.8 to 1.1 gm/cc;

limiting said pressure to a maximum of 250 pounds per square inch of segment surface area.

3. A clutch assembly including a first frustoconical surface nonrotatable relative to a first jaw clutch; a blocker ring mounted for a limited degree of rotation relative to a second jaw clutch and having a second frustoconical surface frictionally engagable with the first surface in response to initial, axial engaging movement of the jaw clutches by an actuator means; a liquid coolant in communication with the friction surfaces; the blocker ring having means operative to block asynchronous engagement of the jaw clutches; characterized by;

at least three friction material segments bonded to at least one of the frustoconical surfaces with their leading and trailing edges substantially equal circumferential distances apart, said segments being formed of an openly porous carbon/carbon composite material comprising a substrate defined by a carbon fibrous yarns woven into a single layer of fabric substrate and coated with carbon deposited thereon by chemical vapor deposition process, said fibrous material and weave being formed to provide the substrate with resiliency in a direction normal to the plane of the weave before and after the chemical vapor deposition process, said resiliency being greater than the resiliency of a comparable weave formed of carbon fibrous strands coated with comparable amounts of carbon by chemical vapor deposition, and the composite being bonded to the one member in a manner substantially preserving said resiliency.

4. The assembly of claim 3, wherein the yarns are formed of twisted carbon fibers.

5. The assembly of claim 4, wherein the density of the composite material is in the range of 0.7 to 1.1 g/cc.

6. The assembly of claim 5, wherein the engaging pressure on the friction surface of the segments is in the range of 150 to 300 pounds per square inch.

7. A clutch assembly including a first frustoconical surface nonrotatable relative to a first jaw clutch; a blocker ring mounted for a limited degree of rotation relative to a second jaw clutch and having a second frustoconical surface frictionally engagable with the first surface in response to initial, axial engaging movement of the jaw clutches by an actuator means; a liquid coolant in communication with the friction surfaces; the blocker ring having means operative to block asynchronous engagement of the jaw clutches; characterized by:

at least three friction material segments formed of a carbon/carbon composite material having a density of 0.3 to 1.3 g/cc and formed from a carbon fiberous substrate coated with carbon deposited thereon by chemical vapor disposition and bonded to at least one of the frustoconical surfaces with their leading and trailing edges being substantially equal circumferential distances apart.

8. The device of claim 7, wherein the density of the composite material is in the range of 0.7 to 1.1 g/cc.

9. The assembly of claim 8, wherein the actuator means includes means for limiting engagement force between the surface of the composite friction material and the frustoconical surface of the other member to a range of 150–300 pounds per square inch of the friction material surface.

10. The device of claim 9, wherein the engaging pressure is in the range of 175 to 245 pounds per square inch.

* * * * *